United States Patent [19]
Downing

[11] 3,899,879
[45] Aug. 19, 1975

[54] TURBINE ENGINE FUEL CONTROL

[75] Inventor: Noel L. Downing, Indianapolis, Ind.

[73] Assignee: General Motors Corporation, Detroit, Mich.

[22] Filed: Nov. 5, 1973

[21] Appl. No.: 412,748

[52] U.S. Cl. ........ 60/39.28 R; 137/599; 137/625.31; 137/489.5; 251/39; 251/61.2; 251/208
[51] Int. Cl. ............................................... F02c 9/08
[58] Field of Search ................ 60/39.28 R, 39.28 T; 137/599, 489.5; 251/39

[56] References Cited
UNITED STATES PATENTS

| | | | |
|---|---|---|---|
| 2,857,742 | 10/1958 | Drake | 60/39.28 T |
| 3,508,396 | 4/1970 | Ifield | 60/39.28 R |
| 3,511,047 | 5/1970 | Yates | 60/39.28 R |
| 3,530,666 | 9/1970 | Cross | 60/39.28 R |

*Primary Examiner*—Clarence R. Gordon
*Attorney, Agent, or Firm*—J. C. Evans

[57] ABSTRACT

A turbine engine fuel control includes a fuel metering valve having two flat valve plates therein operated by a metering valve servo between minimum flow stop and maximum flow stop positions under the control of a pressure sensor. The metering valve servo includes differential piston means responsive to compressor discharge pressure and bleed means to condition the piston means for modulating control of the metering valve. Bleed from the servo is under the control of a pressure ratio sensor including a movable stem having a valve element thereon positioned with respect to the servo bleed port in accordance with engine conditions. A power lever biases the stem of the sensor to establish a preset thrust level. When engine conditions are above or below the preset thrust level, the pressure ratio sensor means overcomes the biasing action of the power lever to close the servo bleed means to provide less or more fuel to maintain the preset thrust level.

2 Claims, 4 Drawing Figures

TURBINE ENGINE FUEL CONTROL

This invention relates to gas turbine fuel control systems and more particularly to such systems using compressor discharge pressure for regulating the amount of fuel supply from a fuel pump to a burner assembly of the engine.

In certain turbine engine fuel supply systems, pumps are driven at turbine speed. In such cases, the high speed of rotation of the pump makes it difficult to control fuel supply by known weight governing type systems.

Accordingly, an object of the present invention is to improve turbine engine fuel supply systems by the provision of means for maintaining a preset engine thrust without the need for weight governing type systems.

Still another object of the present invention is to improve fuel control from a high speed rotating pump component to a burner assembly of a turbine engine by the provision of a metering valve assembly including operative components that are rotated by a metering valve servo mechanism under the control of a pressure ratio speed sensor that operates in conjunction with a spring biasing power lever mechanism to maintain a preset engine thrust level as established by the power lever and wherein the metering valve assembly includes a pair of flat plate elements one fixed and one rotatable by the metering valve servo to direct fuel supply to the burner with high tolerance to contaminated fuel conditions and pressure unbalanced forces.

Still another object of the present invention is to improve gas turbine engine applications for stationary power installations wherein a high speed fuel pump driven off of the turbine engine supplies fuel to a burner assembly therein and a fuel metering valve interposed between the fuel pump and burner assembly has flat relatively rotatable valving plates therein operated by a metering valve servo mechanism which includes differential piston means supplied with a control pressure signal from the discharge pressure of the compressor and bleed means selectively controlled to condition the servo means to position the valve plates in a maximum flow stop position and a minimum flow stop position, the bleed is under the control of a valve means on a movable stem of a pressure ratio sensor mechanism. A power lever biases the stem to preset the control of the servo means by the pressure ratio sensor to a preset engine thrust level. When thrust conditions are above or below the preset level, the pressure ratio sensor mechanism senses these conditions to selectively move the valve means into an opened and closed relation with the bleed means so as to change the fuel supply from the high speed pump to the burner assembly thereby to maintain a preset engine thrust level.

Further objects and advantages of the present invention will be apparent from the following description, reference being had to the accompanying drawings wherein a preferred embodiment of the present invention is clearly shown.

Figure 1:
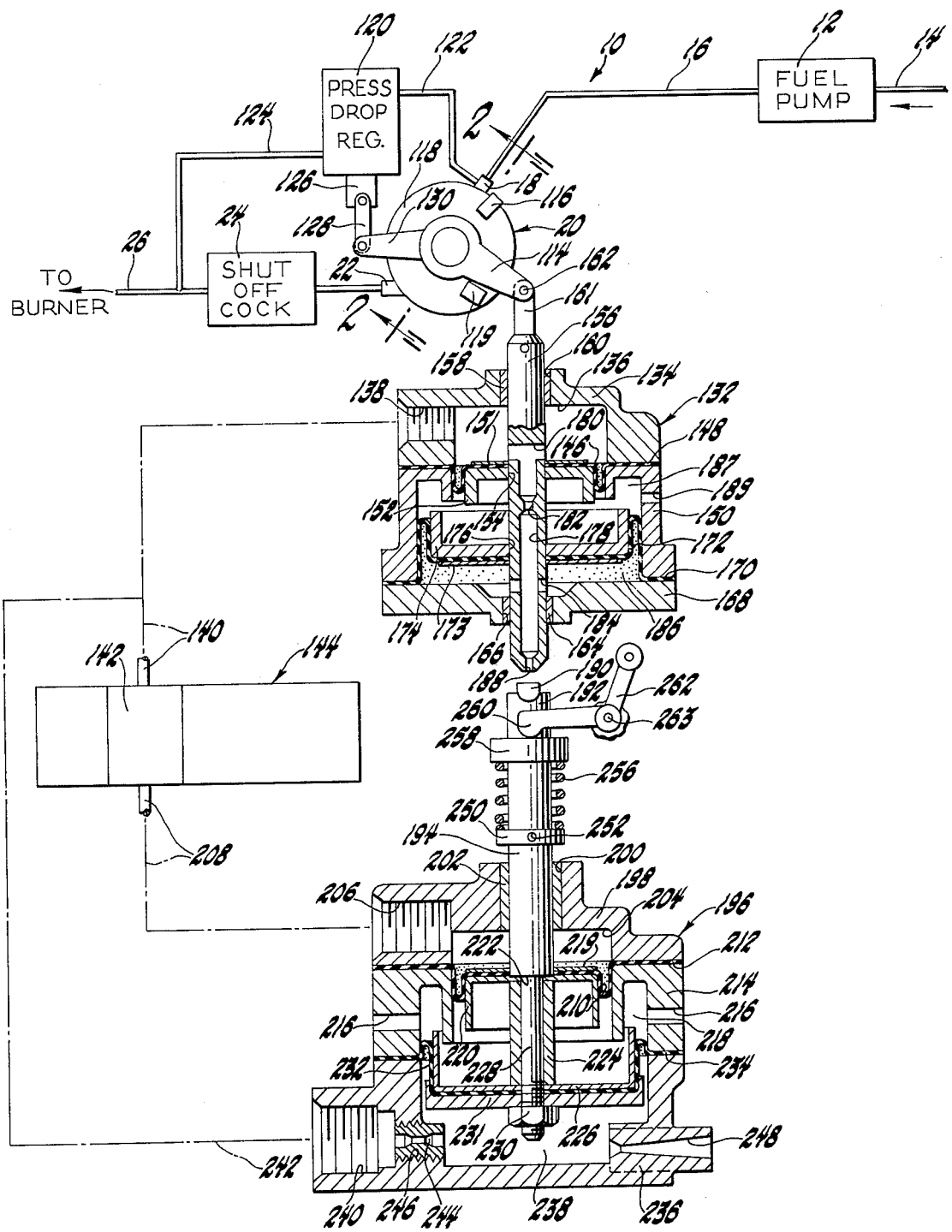
FIG. 1 is a diagrammatic view of a fuel control system including valve control components thereof in vertical section.

Referring now to the drawings, in FIG. 1 a turbine engine fuel control system 10 is illustrated including a fuel pump 12 which is preferably of the type more specifically set forth in U.S. application Ser. No. 370,417, filed June 15, 1973 by Downing. The fuel pump 12 is characterized by having a positive displacement phase of operation wherein a positive displacement pump supplies fuel from start to turbine running speed at a substantial pressure. Thereafter, fuel is supplied by a high speed centrifugal pump driven at turbine speeds. The fuel from the pump 12 is directed from an inlet 14 through a discharge line 16 connected to the inlet 18 of a fuel metering valve 20. The fuel metering valve 20 includes an outlet 22 connected to the inlet of a shut off cock valve 24 that is in turn in communication with a conduit 26 for supplying fuel to a burner assembly of the turbine engine.

Figure 2:
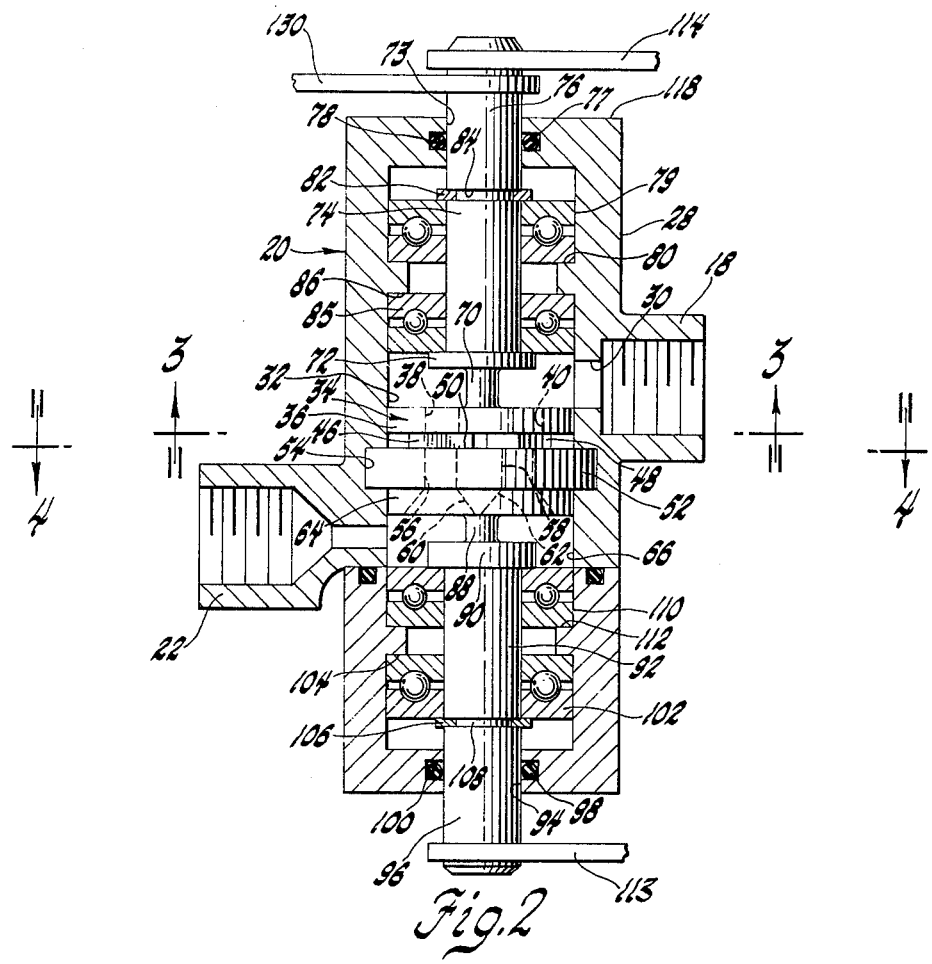
FIG. 2 is an enlarged vertical sectional view taken along the line 2—2 of FIG. 1 looking in the direction of the arrows.
Figure 3:
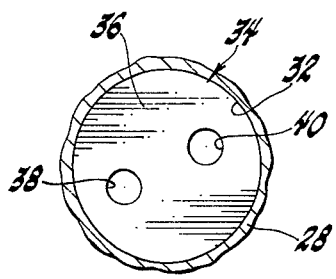
FIG. 3 is a horizontal fragmentary sectional view taken along the line 3—3 of FIG. 2 looking in the direction of the arrows.
Figure 4:
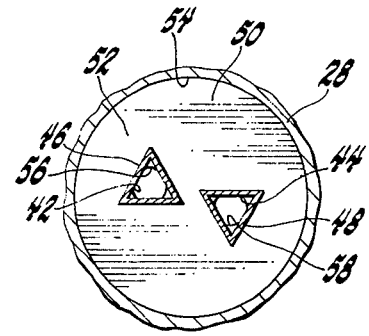
FIG. 4 is a fragmentary horizontal sectional view taken along the line 4—4 of FIG. 2 looking in the direction of the arrows.

The valve 20 as best illustrated in FIGS. 2 and 3 includes a housing 28 with the inlet 18 formed integrally on one side thereof communicated through a bore 30 with a control chamber bore 32. A movable metering valve 34 is rotatably supported in the control chamber bore 32. It includes a flat disc 36 with a pair of passages 38, 40 therethrough that lead to triangular ports 42, 44 respectively formed through triangularly shaped slippers 46, 48 that slide against an end surface 50 of a flat valve plate 52 supportingly received in a bore 54 of larger diameter than bore 32. The flat valve plate 52 has a pair of circular passages 56, 58 therethrough that are axially aligned with the passages 38 and 40 and are also located in overlying relationship with a pair of truncated cone shaped holes 60, 62 respectively formed through a movable valve plate 64 supportingly received in a housing bore 66 for rotation therein.

Disc 36 has a stem 70 connected thereto which is integrally formed with a flange 72 on a valve shaft 74 which is directed outwardly of the housing 28 through opening 73 therein to locate end 76 thereon exteriorly of the housing. The end 76 is sealed with respect to the housing by an O-ring seal 77 located in housing groove 78. It is supportingly received within the housing by a bearing assembly 79 held in place against a housing shoulder 80 by means of a snap ring 82 that is supportingly received within a groove 84 in the valve shaft 74. The shaft 74 is also supported by a second bearing assembly 85 that is located against the flange 72 and a valve housing shoulder 86.

The movable valving element 64 likewide has a central valve stem 88 thereon connected to a flange 90 of a valve shaft 92 directed exteriorly of the housing through an opening 94 therein to locate the end 96 of the shaft 92 exteriorly of the housing. The shaft 92 is sealed with respect to the housing by an O-ring 98 supported within a housing groove 100. The shaft 92 is supported for rotation by a bearing assembly 102 located against a housing shoulder 104 and held axially with respect to the shaft 92 by a snap ring 106 connected thereto at a groove 108 thereon. A second bearing assembly 110 supported on an internal shoulder 112 of the housing 28 is in engagement with the flange 90 of the shaft 92 so as to provide further rotatable support of the flat valve plate 64 with respect to the fixed valve plate 52.

The shaft end 96 is connected to a lever 113 that will rotate the movable flat valve plate 64 with respect to the fixed valve plate 52 so as to move the holes 60, 62 out of alignment with the passages 56, 58 through the plate 52 to block flow between the inlet 18 and outlet 22 thereby defining a valve shut position.

The movable disc 36 is rotated with respect to the fixed valve plate 52 so as to move the triangular openings 42, 44 within the slippers 46, 48 with respect to the circular passages 56, 58 to meter fuel flow from the inlet 18 to the outlet 22.

More particularly, this is accomplished by a control lever 114 which is secured to the end 76 of the valve shaft 74. It is movable between a minimum fuel flow stop 116 on the end 118 of the housing and a maximum fuel flow stop 119 thereon.

Additionally, the system includes a pressure drop regulator 120 that has a sensing line 122 connected to the inlet 18 of the metering valve 20 and an outlet sensing line 124 connected to the conduit 26. When there is an excessive pressure drop across the metering valve 20, a regulator operator 126 connected by link 128 to one end of an actuating arm 130 and having the opposite end connected to the shaft end 76 will rotate the shaft in a direction to maintain a desired pressure drop across the valve 20.

In accordance with certain principles of the present invention, the flat configuration of the movable valve disc 36 and the fixed valve plate 52 will result in a high tolerance to contaminated fuel so as to maintain an assured fuel supply from the pump 12 to the burner of the turbine engine.

In accordance with certain other principles of the present invention, the metering valve 20 is under the control of a metering valve servo assembly 132. The metering valve servo assembly 132 includes a housing portion 134 defining a control chamber 136 therein in communication with an inlet 138 that is connected to a conduit 140 to the discharge pressure of a compressor 142 of a turbine engine 144.

The chamber 136 is closed by a rolling diaphragm 146 having its periphery 148 connected between the housing portion 132 and an intermediate housing portion 150. The diaphragm 146 is supported by a plate 151 and by a piston 152 that is secured at a central opening 154 therethrough to an operating stem 156. The operating stem 156 is supportingly received for reciprocation by a bushing 158 supported within a central opening 160 of the housing portion 134 to extend exteriorly thereof where an end 161 on the stem 156 is connected by means of a pin 162 to the end of the operating lever 114.

The stem 156 has an opposite end thereon supportingly received for reciprocation by a bushing 164 located in the central opening 166 of an end plate 168 that is secured to the base of the intermediate housing portion 150. The end plate 168 engages the periphery 170 of a second larger diameter rolling diaphragm 172 that in turn is supported by a plate 173 and a piston 174 of larger diameter than piston 152 secured to the stem 156 at a central opening 176 therethrough. The stem 156 includes an axial passage 178 therethrough with a cross bore 180 at one end thereof communicating the passage 178 with the control chamber 136. An intermediate orifice 182 in the passage 178 reduces the pressure from the chamber 136 for passage through a cross bore 184 in the stem which intersects the longitudinal passage 178 and communicates it with a second control chamber 186. An orifice opening 188 in the end of the stem 156 defines a bleed which communicates the passage 178 with atmosphere. A chamber 187 between diaphragms 146, 172 is vented to atmosphere through port 189 in housing portion 150.

The orifice opening 188 to atmosphere is under the control of a valve 190 carried on the upper end 192 of an operator stem 194 extending exteriorly of a pressure ratio speed sensor mechanism 196. The sensor mechanism 196 includes a first housing portion 198 thereon with a central opening 200 in which is located a bushing 202 for supporting the stem 194 for reciprocation as it extends from the sensor 196.

The housing portion 198 includes a control chamber 204 therein which is in communication with an inlet port 206 that is connected by a conduit 208 to an intermediate stage pressure of the compressor 142, for example, the sixth or seventh stage of an axial compressor, to direct an intermediate pressure condition from the compressor 142 into the control chamber 204. The control chamber 204 is closed by a rolling diaphragm 210 having its periphery 212 sealed between the housing portion 198 and an intermediate housing portion 214. The intermediate portion has ports 216 therein for communicating a chamber 218 within the intermediate portion 214 with atmosphere.

The rolling diaphragm 210 is supported by a plate 219 and a piston 220 that is connected to a shoulder 222 on the stem 194 and held in place thereon by a bushing 224 which abuts against a piston 226 of larger diameter than the piston 220 secured to the end of a stem extension 228 by means of a nut 230 and end plate 231. The piston 226 supports a larger diameter rolling diaphragm 232 which has its outer periphery 234 connected between the intermediate housing portion 214 and an end housing member 236. The diaphragm 232 and end housing member 236 define a second control chamber 238 which has a first inlet port 240 thereto connected by means of a conduit 242 to the discharge pressure of the compressor 142. An orifice 244 received in an internally threaded bore 246 reduces discharge pressure flow into the chamber 238. Furthermore, the housing includes a venturi 248 thereon which is in communication with ambient pressure thereby producing a resultant regulated pressure in the chamber 238 which is proportional to the compressor discharge pressure. Both orifices 244 and 248 are choked so that pressure in chamber 238 follows at a much lower pressure level and pressure range in a linear manner. This simplifies component design.

A flange 250 is connected on the exterior end of stem 194 by means of a pin 252. It supports one end of a control spring 256 having the opposite end thereof supportingly received on a movable collar 258 that is in engagement with one end 260 of a power lever 262 presettable by rotation about shaft 263 therethrough to a predetermined engine thrust level.

When the power lever 262 is preset to a desired engine thrust level, it will move the collar 258 with respect to the stem 194 against spring 256 to preload the stem so as to produce a predetermined bias of the valve 190 with respect to the orifice opening 188. The pistons 220, 226 define a differential piston area that is responsive to intermediate discharge and a regulated compressor discharge pressure to produce a resultant force on the stem 194 in opposition to the pre-bias. When the engine thrust level is above that set by lever 262, the resultant piston forces of the sensor mechanism 196 on the stem 194 exceeds that of the pre-bias produced by the control lever and the stem 194 is moved to close the orifice opening 188.

At this point, the compressor discharge pressure directed to the control chamber 136 of the servo assembly 132 will act on the piston 152. At the same time, the compressor discharge pressure as reduced across the orifice 182 and directed into the control chamber 186 to act on the greater surface area of the piston 174. The differential piston area defined by pistons 152, 174 produces a resultant force on the stem 156 that will overcome that produced by the piston 152 thereby to produce a resultant movement of the stem 156 outwardly of the servo 132. This will move the operating lever 114 toward the minimum flow stop position to reduce fuel supply to the burner of the turbine engine thereby to reduce the thrust output of the engine to return the thrust to that set by lever 262. As this occurs, the compressor discharge and intermediate pressure from the compressor 142 is reduced. The resultant effect is to direct a lesser pressure into the control chamber 204 which acts on the piston 220 and a reduced pressure is produced in the control chamber 238 acting on the greater surface area of the piston 226. As a result, a lesser force will be produced on the servo stem 194. This will cause the biasing action of spring 256 to move the stem 194 in a direction to open the valve 190. At this point, the control chamber 186 of servo 132 is open to atmosphere and the force produced by the piston 174 will be reduced while the force produced by the piston 152 on the stem 156 will be maintained. This will produce a resultant force on the stem 156 to cause movement thereof inwardly of the housing of the servo mechanism 132 to cause the control lever 114 to move toward the maximum fuel stop position thereby to increase the fuel supply to the burner and produce a resultant increase in the engine thrust. The controlled movement of the lever 114 between the minimum and maximum flow stop positions 118, 119 will produce a continuous modulation of fuel supply so as to produce a control of engine thrust as preset by the power lever 262.

While the embodiments of the present invention, as herein disclosed, constitute a preferred form, it is to be understood that other forms might be adopted.

What is claimed is:

1. A turbine engine fuel supply system comprising: a fuel metering valve having an inlet adapted to be connected to the outlet of a fuel pump and an outlet adapted to supply fuel to a burner assembly of the engine, said fuel metering valve including an orifice plate therein and a movable valve element including means thereon slidable across said orifice plate for varying flow through said orifice plate between the inlet and outlet of said valve, a shaft connected to said movable valve element, a lever connected to one end of said shaft, means for limiting arcuate movement of said lever and said valve element between minimum flow stop and maximum flow stop positions, metering valve servo means having a first axially movable stem and differential piston means therein connected to said first axially movable stem, said first differential piston means responsive to compressor discharge pressure, means including an orifice for bleeding pressure from said first differential piston means to condition said servo means to position said first axially movable stem to cause said lever to assume a maximum flow stop position where said movable valve element is moved a fixed arcuate amount with respect to said orifice plate, valve means for closing said bleed port to condition said differential piston means to position said movable valve element toward its minimum flow stop position, a pressure ratio sensor means having second differential piston means therein selectively responsive to a regulated pressure proportional to compressor discharge pressure and an intermediate pressure of the compressor, a second axially movable stem aligned coaxially of said first stem operated by the second differential piston means and connected to said valve means, means including a power lever for biasing the second axially movable stem against the control action of said sensor means, said power lever being positioned to establish a predetermined engine thrust, said sensor means being responsive to a reduced compressor discharge pressure produced by a change in engine thrust less than that set by the power lever to position said valve means to open said servo means bleed port thereby to condition said servo means to move said movable valve element towards its maximum stop position to increase fuel supply to a burner thereby to increase engine thrust to a level as preset by the power lever, said sensor means being responsive to an increased compressor discharge pressure produced by an engine thrust above a preset power level to move said valve means to close said servo means bleed port thereby to condition said servo means to shift said movable valve element toward the minimum flow stop position to reduce fuel supply to the engine burner thereby to return engine operation to a desired thrust level as preset by said power level.

2. A fuel metering system for a turbine engine including a compressor for supplying combustion air to a burner assembly for maintaining a predetermined engine thrust wherein fuel is supplied to the burner from a fuel pump, the improvement comprising: a fuel metering valve having an inlet adapted to be connected to the fuel pump and an outlet adapted to be connected to the burner, said metering valve including a fixed orifice plate interposed between the inlet and the outlet for controlling fuel flow therebetween and a movable valve element for varying the flow area through said orifice plate, said movable valve element having a minimum flow stop position and a maximum flow stop position, metering valve servo means including an operator coupled to said movable valve element for positioning said valve element between the minimum and maximum flow stop positions, said metering valve servo means including a pair of differential area pistons therein, means including one of said pistons forming a first pressurizable chamber, an inlet to said first pressurizable chamber to receive a compressor discharge pressure signal, means including a second one of said pistons for defining a second pressurizable control chamber, means for directing the compressor discharge pressure signal from said first chamber to said second chamber including an orifice therein for reducing the pressure signal from said compressor discharge into said second chamber, means for bleeding air from said chamber including a servo means bleed port, a bleed valve selectively opening and closing said bleed port for conditioning said servo means when said port is opened to produce a resultant force on said movable valve element to shift said movable valve element toward a maximum fuel stop position and to condition said servo means when the bleed port is closed to produce a resultant force on said movable valve element to return it toward its minimum flow stop position, said bleed valve being positioned by means including a pressure ratio sensor means including differential piston means therein, an axially movable operator stem connected to said differential piston means and to said bleed valve, said sensor differential piston means including a first pressurizable control chamber, an inlet to said pressurizable control chamber adapted to receive a pressure signal from an intermediate stage of a compressor, said differential piston means including a second pressurizable control chamber, means for directing a regulated pressure into said second chamber proportional to the compressor discharge pressure signal, said axially movable operator stem being biased in a first direction in response to pressurization of said control chambers, means including a power throttle lever for biasing said operator stem in an opposite direction to the bias of said pressurized control chambers, said differential piston means of said sensor means responding to pressure conditions of its first and second control chambers when the regulated proportional pressure is below that produced in response to a desired thrust setting of said power lever to condition said sensor means to position said operator stem to cause said bleed valve to open said bleed port thereby to condition said movable valve element towards the maximum flow position to increase engine thrust to return it to the power lever setting, said control chambers of said sensor means responding to compressor discharge and intermediate pressures as produced by reduced engine load to condition said operator to position said bleed valve to close said bleed port thereby to condition the differential piston means of said servo means to cause said movable valve element to move into a minimum flow stop position.

* * * * *